US010351144B2

(12) United States Patent
Yoshizu

(10) Patent No.: US 10,351,144 B2
(45) Date of Patent: Jul. 16, 2019

(54) SIGHTLINE ESTIMATION SYSTEM AND SIGHTLINE ESTIMATION METHOD

(71) Applicant: Toyota Jidosha Kabushiki Kaisha, Toyota-shi, Aichi-ken (JP)

(72) Inventor: Sayaka Yoshizu, Kawasaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 15/831,901

(22) Filed: Dec. 5, 2017

(65) Prior Publication Data
US 2018/0154905 A1   Jun. 7, 2018

(30) Foreign Application Priority Data

Dec. 7, 2016   (JP) ................................. 2016-238034

(51) Int. Cl.
*B60Q 1/00*   (2006.01)
*B60W 40/08*   (2012.01)
*G06K 9/00*   (2006.01)
B60W 30/10   (2006.01)
G08G 1/0962   (2006.01)

(52) U.S. Cl.
CPC ......... *B60W 40/08* (2013.01); *G06K 9/00604* (2013.01); *G06K 9/00845* (2013.01); *B60W 30/10* (2013.01); *B60W 2040/0818* (2013.01); *B60W 2420/42* (2013.01); *B60W 2420/52* (2013.01); *B60W 2540/00* (2013.01); *B60W 2550/402* (2013.01); *G08G 1/0962* (2013.01)

(58) Field of Classification Search
CPC ..... B60W 2040/0818; B60W 2420/42; B60W 2420/52; B60W 2540/00; B60W 2550/402; B60W 30/10; B60W 40/08; G06K 9/00604; G06K 9/00845; G08G 1/0962
USPC ........................................................ 340/439
See application file for complete search history.

(56) References Cited

U.S. PATENT DOCUMENTS

| 9,909,888 B2* | 3/2018 | Akiyama ........... G01C 21/3461 |
| 2004/0150514 A1* | 8/2004 | Newman ................ B60Q 9/008 340/435 |
| 2007/0089054 A1* | 4/2007 | Morimoto ................ B60Q 9/00 715/700 |

(Continued)

FOREIGN PATENT DOCUMENTS

| JP | 2003327009 A | 11/2003 |
| JP | 2008045962 A | 2/2008 |

(Continued)

*Primary Examiner* — Naomi J Small
(74) *Attorney, Agent, or Firm* — Dismore & Shohl LLP

(57) ABSTRACT

A sightline estimation system includes a sightline detection unit, a related information acquisition unit, a holding unit, which holds sightline information, and a difference extraction unit. The difference extraction unit performs a selection process to select, from the related information held in the holding unit, the related information corresponding to the related information acquired at the time of current detection of a sightline of the driver and also extracts the difference between the distribution of sightlines of the driver acquired from the sightline information associated with the selected related information and the distribution of the sightlines acquired within a predetermined period including the current detection of the sightline. The sightline estimation system further includes a sightline estimation unit.

11 Claims, 10 Drawing Sheets

(56) References Cited

U.S. PATENT DOCUMENTS

| | | | | |
|---|---|---|---|---|
| 2008/0236929 A1* | 10/2008 | Fukaya | ............... | B60T 7/22 |
| | | | | 180/272 |
| 2009/0237644 A1 | 9/2009 | Uechi | | |
| 2012/0046857 A1* | 2/2012 | Mori | ............... | G06K 9/00604 |
| | | | | 701/301 |
| 2015/0154461 A1* | 6/2015 | Kitaura | ............... | G06K 9/00845 |
| | | | | 348/148 |
| 2016/0342205 A1* | 11/2016 | Shigeta | ............... | A61B 3/113 |

FOREIGN PATENT DOCUMENTS

| | | |
|---|---|---|
| JP | 2008-071162 A | 3/2008 |
| JP | 2008-146356 A | 6/2008 |
| JP | 2008-210239 A | 9/2008 |
| JP | 2008232912 A | 10/2008 |
| JP | 2011218872 A | 11/2011 |
| JP | 2013178827 A | 9/2013 |

* cited by examiner

Fig.2
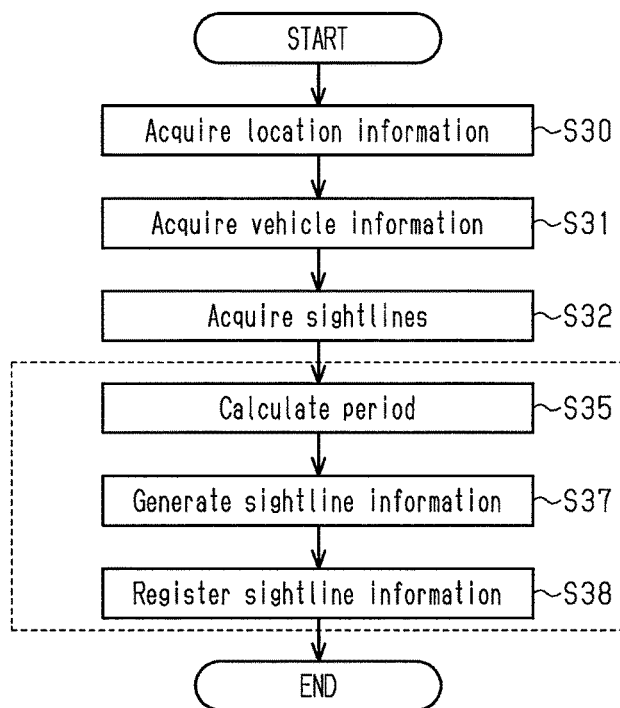
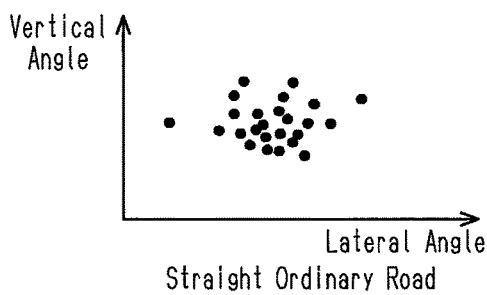
Fig.3A
Vertical Angle ↑
Lateral Angle →
Straight Ordinary Road
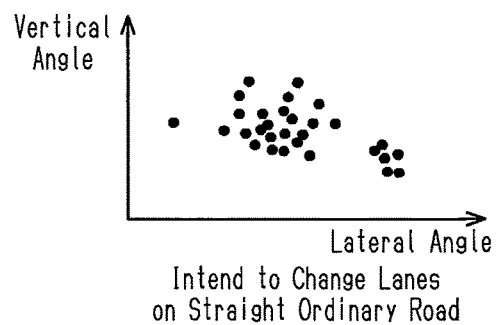
Fig.3B
Vertical Angle ↑
Lateral Angle →
Intend to Change Lanes
on Straight Ordinary Road

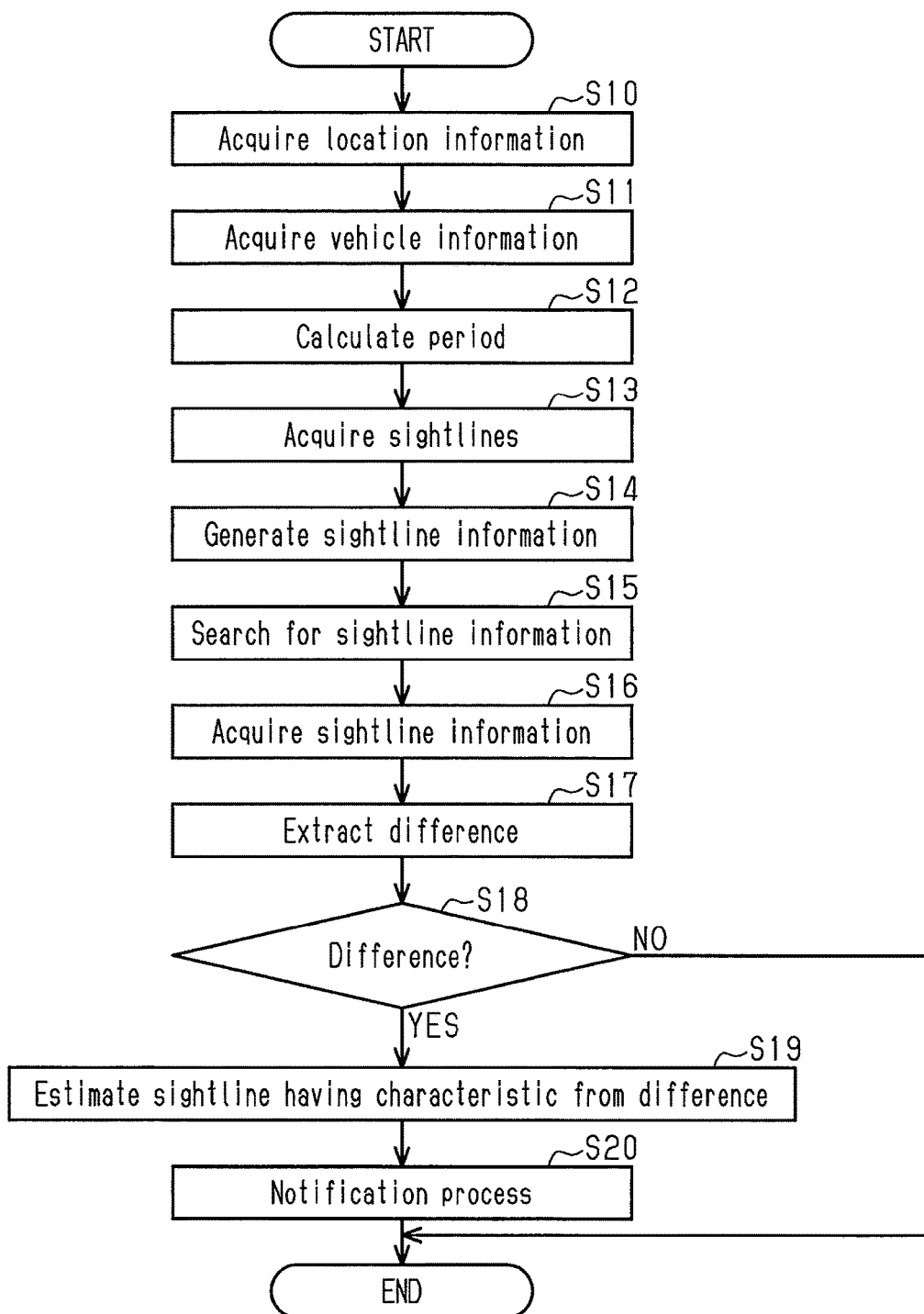

SIGHTLINE ESTIMATION SYSTEM AND SIGHTLINE ESTIMATION METHOD

CROSS-REFERENCE TO RELATED APPLICATIONS

This application claims priority to Japanese Patent Application No. 2016-238034 filed Dec. 7, 2016, which is incorporated herein by reference.

BACKGROUND

The present disclosure relates to a sightline estimation system and a sightline estimation method for estimating a sightline of a driver of a vehicle.

A great amount of resources are now being used to research and develop technology for estimating the sightline of a vehicle driver based on the facial image of the driver captured by a camera. Such a technology can be applied to a device that issues a warning to a vehicle driver when detecting, from the sightline direction of the driver, that the driver is inattentively driving the vehicle or not making the necessary safety precautions. The technology may also be applied to a device that predicts, from the sightline direction of the driver, the next action or intention of the driver to control operation of the vehicle. Further, the technology may be applied to a device that provides information related to about an in the direction of the sightline of the vehicle driver. Japanese Laid-Open Patent Publication No. 2008-210239 describes an example of a sightline estimation device that estimates the sightline of a driver.

The sightline estimation device estimates the sightline direction based on the direction of the face and the direction of the eyes detected from the facial image of the vehicle driver using the camera as a reference. The sightline estimation device also estimates a front side reference that recognized by the vehicle driver as the front based on time-series changes in the sightline direction using the camera as a reference. The sightline estimation device corrects the sightline direction based on the front side reference using the camera as a reference and outputs a sightline signal indicating the corrected sightline direction.

The technology described in Japanese Laid-Open Patent Publication No. 2008-210239 allows the sightline direction of the driver to be estimated with high accuracy.

When the details of driving assistance are determined based on the characteristics of the sightline of the driver, the accuracy of driving assistance is effectively improved. Moreover, when information related to an event attracting the attention of the driver is provided based on the characteristics of the sightline of the driver, the benefits obtained from the provided information become further effective. As apparent from the foregoing examples, there is an increasing demand for the utilization of the characteristics of the sightline of a driver in the field of various types of on-board information processing. However, the sightline of a driver frequently changes in accordance with each type of information related to the traveling vehicle, such as information related to the situation in which the vehicle is traveling and the state of the vehicle in that situation. Thus, it is not easy to acquire the characteristics when the sightline frequently of the driver frequently changes.

SUMMARY

Accordingly, it is an object of the present disclosure to provide a sightline estimation system and a sightline estimation method that allows the characteristics of the sightline of a driver to be easily obtained.

To achieve the above object, a sightline estimation system that estimates a sightline characteristic of a driver of a vehicle includes a sightline detection unit, a related information acquisition unit, a holding unit, a difference extraction unit, and a sightline estimation unit. The sightline detection unit is configured to detect a sightline of the driver with respect to a traveling direction of the vehicle. The related information acquisition unit is configured to acquire related information that is information related to traveling of the vehicle. The holding unit holds sightline information that associates a sight line of the driver detected by the sightline detection unit with the related information acquired at the time of detection of the sightline of the driver. The difference extraction unit is configured to perform a selection process that selects from the related information held in the holding unit, the related information corresponding to the related information acquired at the time of current detection of the sightline of the driver and in further configured to extract a difference between a distribution of sightlines of the driver acquired from the sightline information associated with the selected related information and a distribution of the sightlines acquired within a predetermined period including the current detection of the sightline. The sightlines estimation unit is configured to estimate a sightline characteristic based on the difference extracted by the difference extraction unit.

To achieve the above object, a method for estimating a sightline characteristic of a driver of a vehicle includes detecting a sightline of the driver with respect to a traveling direction of the vehicle; acquiring related information related to traveling of the vehicle; holding sightline information that associates a detected sightline of the driver with the related information acquired at the time of detection of the sightline of the driver; performing a selection process that selects, from the held related information, the related information corresponding to the related information acquired at the time of current detection of the sightline of the driver; extracting a difference between a distribution of sightlines of the driver acquired from the sightline information associated with the selected related information and a distribution of the sightlines acquired within a predetermined period including the current detection of the sightline; and estimating a sightline characteristic of the driver based on the extracted difference.

To achieve the above object, a sightline estimation system that estimates a sightline characteristic of a driver of a vehicle includes a circuitry, wherein the circuitry is configured to detect a sightline of the driver with respect to a traveling direction of the vehicle; acquire related information related to traveling of the vehicle; hold sightline information that associates a detected sightline of the driver with the related Information acquired at the time of detection of the sightline of the driver; perform a selection process that selects, from the held related information, the related information corresponding to the related information acquired at the time of current detection of the sightline of the driver; extract a difference between a distribution of sightlines of the driver acquired from the sightline information associated wild the selected related information and a distribution of the sightlines acquired within a predetermined period including the current detection of the sightline; and estimate a sightline characteristic of the driver based on the extracted difference.

BRIEF DESCRIPTION OF DRAWINGS

The present disclosure, together with objects and advantages thereof, may best be understood by reference to the following description of the present embodiments together with the accompanying drawings in which:

FIG. 2 is a flowchart illustrating procedures performed by the sightline estimation system illustrated in FIG. 1 to register sightline information;

FIGS. 3A and 3B are diagrams illustrating the distribution of sightlines included in registered sightline information of the sightline estimation system illustrated in FIG. 1, where FIG. 3A is a diagram illustrating the distribution of sightlines when a vehicle is traveling on a straight ordinary road, and FIG. 3B is a diagram illustrating the distribution of sightlines when a driver attempts to change lanes (course) on a straight ordinary road;

FIG. 4A is a diagram illustrating a reference distribution of sightlines, and FIG. 4B is a diagram illustrating a comparison subject distribution of sightlines;

FIG. 5A is a diagram illustrating a reference distribution of sightlines, and FIG. 5B is a view illustrating a comparison subject distribution of sightlines;

FIG. 6 is a flowchart illustrating procedures of a process performed by the sightline estimation system illustrated in FIG. 1 to estimate sightlines;

FIG. 8A is a view illustrating a reference distribution or sightlines, and FIG. 8B is a diagram illustrating a comparison subject distribution of sightlines;

EMBODIMENTS OF THE PRESENT DISCLOSURE

First Embodiment

A sightline estimation system according to a first embodiment will now be described with reference to FIGS. 1 through 6. The sightline estimation system is installed a vehicle 1.

Figure 1:
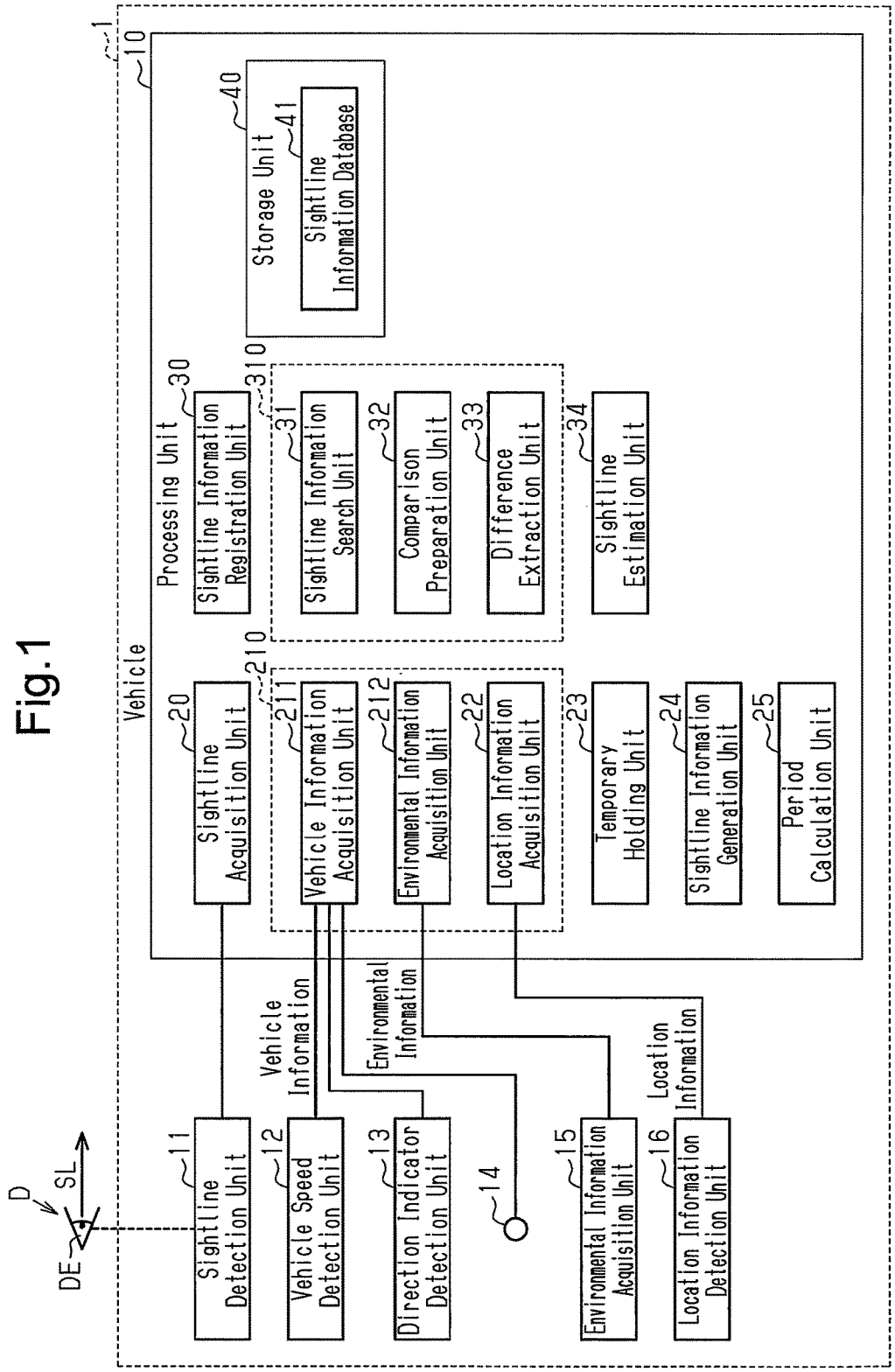
FIG. 1 is a schematic block diagram illustrating the configuration of a sightline estimation system in a first embodiment.

A brief overview of the sightline estimation system according to the first embodiment will first be described with reference to FIG. 1.

The sightline estimation system estimates the sightline of a driver (not illustrated) of the vehicle 1. The sightline estimation system includes a sightline detection unit 11 which detects a sightline of the driver with respect to a front direction of the vehicle 1, and a related information acquisition unit 210, which acquires related information indicating details of traveling of the vehicle 1. The related information acquisition unit 210 according to the first embodiment includes vehicle information acquisition unit 211, an environmental information acquisition unit 212, and a location information acquisition unit 22. However, the related information acquisition unit 210 may be configured by at least one of the vehicle information acquisition unit 211, the environmental information acquisition unit 212, and the location information acquisition unit 22. Related information is information indicating details related to traveling of the vehicle 1 and includes, for example, vehicle information, such as the vehicle speed, and environmental information indicating the traveling environment, such as the road form, the present location, weather, and time. The sightline estimation system includes a storage unit 40 that functions as a holding unit for holding sightline information, which indicates the sightline of the driver detected by the sightline detection unit 11 of the vehicle 1, and related information, which is acquired at the time of detection of the sightline of the driver, in association with each other. The sightline detection unit 11 defects the sightline of the driver, while the related information acquisition unit 210 acquires related information at the time of detection of the sightline. The sightline estimation system further includes a sightline information search unit 31. The sightline information search unit 31 performs a selection process for selecting related information corresponding to related information currently and newly acquired from existing related information held in the storage unit 40. The sightline estimation system includes a difference extraction unit 33 that extracts a difference between a distribution of sightlines of the driver acquired from sightline information associated with selected related information and a distribution of sightlines acquired within a predetermined period including a time of current detection of a sightline. The sightline estimation system further includes a sightline estimation unit 34 that estimates a sightline characteristic based on a difference extracted by the difference extraction unit 33.

Accordingly, the sightline estimation system easily extracts a discrepancy or a difference between the distribution of existing sightlines of the driver held in the storage unit 40 and the distribution of sightlines of the driver currently detected. This difference clarifies, as a characteristic of a sightline of the driver, a sightline contained in the distribution of the sightlines of the driver currently detected but not contained in the distribution of the existing sightlines held in the storage unit 40 or a sightline not contained in the distribution of the sightlines of the driver currently detected but contained in the distribution of the existing sightlines held in the storage unit 40. The sightline characteristic of the driver is thus estimated from the difference, so that functions associated with driving assistance, and information indicating an event attracting attention from the driver, for example, can be provided to the driver based on the estimated sightline characteristic of the driver.

Details of a vehicle display device according to the first embodiment are hereinafter described with reference to FIG. 1.

The vehicle 1 is a car driven by the driver. The vehicle 1 includes a processing unit 10 which estimates a sightline, a sightline detection unit 11 which detects a sightline of the driver, a vehicle speed detection unit 12 which detects a speed of the vehicle 1, a direction indicator detection unit 13 which detects actions of direction indicators, and a driving situation collection unit 14 which collects data related to the driving situation of the vehicle 1. The vehicle 1 further includes an environmental information acquisition unit 15, which acquires information related to a traveling environment such as road situation and weather, and a location information detection unit 16, which detects the present location. The driving situation collection unit 14 includes a plurality of sensors and the like, while the environmental information acquisition unit 15 includes a plurality of cameras, radars, sensors, and the like.

The vehicle 1 further includes an onboard network connecting the processing unit 10, the sightline detection unit 11, the vehicle speed detection unit 12, the direction indicator detection unit 13, the driving situation collection unit 14 including sensors, the environmental information acquisition unit 15 including cameras, radars and the like, and the location information detection unit 16. Accordingly, the processing unit 10, the sightline detection unit 11, the vehicle speed detection unit 12, the direction indicator detection unit 13, the driving situation collection unit 14 including sensors, the environmental information acquisition unit 15 including cameras, radars and the like, and the location information detection unit 16 are capable of transmitting and receiving communication messages to and from one another. The communication protocol of the on-board network includes a controller area network (CAN) protocol, for example. The on-board network may include a wireless communication path provided in part of a communication path. Further, the on-board network may include a path which passes through another network via a gateway or the like.

The sightline detection unit 11 includes a sightline detection camera to detect a sightline SL with respect to the sightline detection camera based on a facial image of a driver D or an orientation of an eye DE, and output detected data related to the sightline SL of the driver D to the processing unit 10. The sightline detection unit 11 is formed by a known device referred to as an eye tracking device or a sightline measurement system. The sightline detection unit 11 detects the orientation of the eye DE with respect to the sightline detection camera, namely, the vertical direction angle and the lateral direction angle of a sightline. The sightline detection unit 11 further converts the orientation of the eye DE detected by the sightline detection camera into an orientation with respect to the front direction of the vehicle 1 based on the installation position of the sightline detection camera with respect to the front direction of the vehicle 1. In some embodiments, the sightline detection unit 11 detects the sightline SL of the driver D in a cycle of approximately 100 ms or shorter. In the following description, the reference characters "D," "DE," and "SL" respectively denoting the driver, the eye, and the sightline will hereafter not be used to simplify the description.

The vehicle speed detection unit 12 detects the speed of the vehicle 1 in a predetermined cycle, and outputs data related to the detected speed to the processing unit 10. The speed of the vehicle 1 is detected in a relatively short cycle in comparison with detection cycles of other various types of vehicle information.

The direction indicator detection unit 13 detects operation of the direction indicators provided on the left and right sides of the vehicle 1 and outputs data related to the detected operations of the direction indicators to the processing unit 10. Each direction indicator is activated before the vehicle 1 turns left or right or before the vehicle 1 changes lanes. Accordingly, the processing unit 10 is capable of estimating a driving operation which will be subsequently performed for the vehicle 1 based on the detected direction indicator operation.

The driving situation collection unit 14 includes various types of sensors provided on the vehicle 1. For example, the driving situation collection unit 14 detects a steering angle, acceleration, an accelerating pedal operation, a braking operation, an engine speed and the like by using the various types of sensors and outputs the detected results to the processing unit 10.

The environmental information acquisition unit 15 acquires environmental information corresponding to information related to a traveling environment and outputs the acquired environmental information to the processing unit 10. The cameras included in the environmental information acquisition unit 15 are on-board cameras for capturing images outside the vehicle 1 in the front, rear, sides and other areas around the vehicle 1 to acquire the situation around the vehicle 1 based on the acquired images. The situations around the vehicle 1 include the existence or non-existence of a pedestrian, the existence or non-existence of an obstacle, the existence or non-existence of another vehicle, the road situation, the traffic situation, and the existence or non-existence of a signal, for example. The radars of the environmental information acquisition unit 15 include a millimeter-wave radar, a sound wave sensor, or the like to recognize the existence or non-existence of an obstacle based on the acquired radar information and acquire the distance to the recognized obstacle. The environmental information acquisition unit 15 may include various types of sensors which detect weather, brightness, and the like.

The location information detection unit 16 detects the latitude and longitude of the present location, for example, by using at least one of a satellite signal of a global positioning system (GPS) or the like, a terrestrial beacon, and a gyroscope. The location information detection unit 16 outputs detected location information to the processing unit 10.

The processing unit 10 can acquire time from the location information detection unit 16, an on-board clock, or the like.

The processing unit 10 is an electronic control unit (ECU), for example, which includes a microcomputer equipped with a central processing unit (CPU) and a storage unit. The processing unit 10 includes an arithmetic unit which performs a program calculation process, and a storage. The storage includes a read only memory (ROM) which stores programs, data and others, and a volatile memory (random access memory, RAM) which temporarily stores a calculation result of the arithmetic unit. The processing unit 10 further includes a storage such as a backup memory enabled to store and hold setting values and calculated values by constant supply of power from a battery, and a flash memory for holding data, and the like. Examples of the storage, or computer-readable medium, include any type of available media accessible from a versatile or dedicated computer. Accordingly, the processing unit 10 is allowed to load programs and setting values held in the storage into the arithmetic unit and execute the loaded programs and setting values to perform predetermined functions. For example, the processing unit 10 performs a process for estimating a sightline of the driver based on a characteristic change of the sightline of the driver.

The processing unit 10 may include dedicated hardware (application specific integrated circuit, ASIC) which executes at least a part of processes of various types. Accordingly, the processing unit 10 may be configured by a circuitry which includes 1) one or more processors operating under computer programs (software), 2) one or more dedicated hardware circuits such as ASIC, or 3) a combination of 1) and 2).

Each of the sightline detection unit 11, the vehicle speed detection unit 12, the direction indicator detection unit 13, the driving situation collection unit 14, the environmental information acquisition unit 15, and the location information detection unit 16 may be any one of a device which only outputs a detection result to the processing unit 10 without change, a device which includes a circuit performing requisite minimum information processing under a dedicated program, and an ECU.

The processing unit 10 includes the storage unit 40. The storage unit 40 includes a sightline information database 41. The sightline information database 41 is a database provided for registration of sightline information which includes a plurality of sightlines of the driver, namely, the sightline distribution, and related information associated with the sightline distribution. In other words, sightline information includes both related information and sightlines of the driver corresponding to the related information. According to the first embodiment, pieces of sightline information classified for each type of predetermined related information are registered to the sightline information database 41.

Related information will now be described in detail. Related information is information given for classification of driving states of the vehicle 1. Related information includes one or more parameters selected from various types of parameters related to traveling of the vehicle 1. One piece of related information corresponds to one classification of various types of driving states of the vehicle 1. Sightline information corresponding to one piece of related information includes a plurality of sightlines of the driver as a sightline distribution. For example, related information includes the vehicle speed (speed range) as a parameter based on which a driving state of the vehicle is classified into a traveling state of the vehicle 1 on an ordinary road or a traveling state of the vehicle 1 on a highway. Moreover, related information includes the vehicle speed, the steering angle, and operations of the direction indicators as parameters, for example, based on which a driving state of the vehicle 1 is classified into a rightward turn, a leftward turn, a course change to a right lane, or a course change to a left lane, for example. More specifically, when examples of driving states of the vehicle 1 include a rightward turn, a leftward turn, a route change to a right lane, and a route change to a left lane, related information say include parameters such as the vehicle speed, the steering angle, and operation of the direction indicators.

In addition, related information is information given for identification of a driving state of the vehicle 1. Sightline information includes sightlines of the driver in a predetermined period corresponding to related information. In some embodiments, the predetermined period is a period ranging from the minimum period to the maximum period necessary for identification of a driving state.

The processing unit 10 includes a sightline acquisition unit 20 which acquires a detected sightline of the driver, and the related information acquisition unit 210 described above. The processing unit 10 further includes a temporary holding unit 23 which temporarily holds a plurality of acquired sightlines, a sightline information generation unit 24 which generates sightline information described above, and a period calculation unit 25 which determines a predetermined period given in correspondence with related information for detection of sightlines of the driver.

The sightline acquisition unit 20 acquires a sightline detected by the sightline detection unit 11 from the driver.

The related information acquisition unit 210 includes the vehicle information acquisition unit 211 which acquires vehicle information, the environmental information acquisition unit 212 which acquires traveling environmental information, and the location information acquisition unit 22 which acquires present location information. In other words, in the present embodiment, the related information includes at least one of vehicle information, traveling environment information, and a present location, and in some embodiments includes at least a vehicle speed.

The vehicle information acquisition unit 211 acquires information related to a detected vehicle speed from the vehicle speed detection unit 12, information related to detected operations of the direction indicators from the direction indicator detection unit 13, and outputs from the on-board various sensors of the driving situation collection unit 14.

The environmental information acquisition unit 212 acquires images, detection results, and the like from the environmental information acquisition unit 15 as information related to a traveling environment of the vehicle 1.

The location information acquisition unit 22 acquires location information from the location information detection unit 16.

The temporary holding unit 23 temporarily holds a sightline acquired by the sightline detection unit 11 and related information acquired by the related information acquisition unit 210 at the time of detection of the sightline in association with each other. In some embodiments, the period for temporarily holding the sightline and the related information in association with each other be a predetermined period calculated by the period calculation unit 25 or shorter. Part of or the entire temporary holding unit 23 may be included in the storage unit 40.

The sightline information generation unit 24 generates sightline information which includes a plurality of sightlines of the driver detected within the predetermined period calculated by the period calculation unit 25 and related information acquired in the same period in association with each other. The sightlines, or sightline distribution, correspond to a single piece of related information. In this manner, sightline information including sightlines (sightline distribution) associated with related information is generated. The sightline information generation unit 24 accumulates generated sightline information in the storage unit 40. The accumulation of sightline information increases the probability for acquiring appropriate sightline information when searching for sightline information. Accordingly, determination of a difference between sightline distributions is expected to become more accurate.

The period calculation unit 25 calculates a predetermined period for detecting sightlines of the driver based on related information to determine a period for detecting sightlines corresponding to the related information. The period calculation unit 25 calculates the predetermined period while considering effects of a driving state of the vehicle 1 imposed on a sightline. For example, while the vehicle 1 is traveling on an ordinary road, the period calculation unit 25 sets the predetermined period to a period in a range from 5 seconds to 10 seconds based on the fact changes are large in the traveling environment and thus changes are large in the sightline. While the vehicle 1 is traveling on a highway road, the period calculation unit 25 sets the predetermined period to a period in a range from 10 seconds to 20 seconds based on the fact that changes are small in the traveling environment and thus changes are small in the sightline. While the vehicle 1 is turning to the right or left, the period calculation unit 25 sets a period ranging from when the generation of a turn signal of the direction indicator starts to when the generation of the turn signal ends as the predetermined period. While the vehicle 1 is changing its course to a right lane or a left lane, the period calculation unit 25 sets a period ranging from several seconds before the direction indicator starts to generate a turn signal to several seconds after the generation of the turn signal ends as the predetermined period.

The processing unit 10 includes a sightline information registration unit 30 which registers sightline information in the storage unit 40, a difference acquisition unit 310 which acquires a difference between two sightline distributions, and a sightline estimation unit 34 which estimates a characteristic sightline with respect to a reference based on the acquired difference.

The sightline information registration unit 30 receives sightline information generated by the sightline information generation unit 24 and registers the sightline information in the sightline information database 41.

With reference to FIG. 2, a process performed by the processing unit 10 to register sightline information will now be described.

As illustrated in FIG. 2, when the process for registering sightline information starts, the location information acquisition unit 22 of the processing unit 10 acquires location information (step S30). The vehicle information acquisition unit 211 of the processing unit 10 acquires vehicle information (step S31). The sightline acquisition unit 20 of the processing unit 10 acquires sightlines of the driver (step S32), while the period calculation unit 25 of the processing unit 10 calculates a period for detecting sightlines based on related information including the vehicle information and the location information (step S35 in FIG. 2). The sightline information generation unit 24 of the processing unit 10 generates sightline information including the sightlines of the driver detected within the predetermined period calculated by the period calculation unit 25 (step S37). The sightline information registration unit 30 of the processing unit 10 receives the sightline information, which includes the related information and a sightline distribution, and registers the sightline information to the sightline information database 41 with the related information and sightline distribution associated with each other (step S38).

With reference to FIGS. 3A and 3B, a sightline distribution included in sightline information registered by the processing unit 10 will now be described. FIGS. 3A and 3B each illustrate an example of a sightline distribution included in sightline information.

FIG. 3A illustrates a sightline distribution included in sightline information under the assumption that the related information indicates traveling on a straight ordinary road. In this case, sightlines of the driver tend to concentrate on positions around the front center of the vehicle 1 in the traveling direction. FIG. 3B illustrates a sightline distribution included in sightline information under the assumption that related information indicates an intention of a course change to a right lane on a straight ordinary road. In this case, sightlines of the driver tend to concentrate on positions around the front center of the vehicle 1 in the traveling direction and positions around a door mirror provided on the front right of the vehicle 1 to check the right rear side.

The difference acquisition unit 310 compares a sightline distribution of the driver held in the temporary holding unit 23 with a sightline distribution of the driver included in sightline information registered in the sightline information database 41 to acquire a difference between these two sightline distributions.

With reference to FIGS. 4A, 4B, 5A, and 5B, the difference between the sightline distribution included in sightline information held in the storage unit 40 and the sightline distribution held in the temporary holding unit 23 will now be described. Each of the sightline distributions illustrated in the drawings contains a plurality of sightlines of the driver each plotted at a position defined based on a lateral direction angle and a vertical direction angle of the corresponding sightline in the front direction of the vehicle 1. The sightlines configure a collection of sightlines of the driver detected within a predetermined period in correspondence with related information.

Figure 4A:
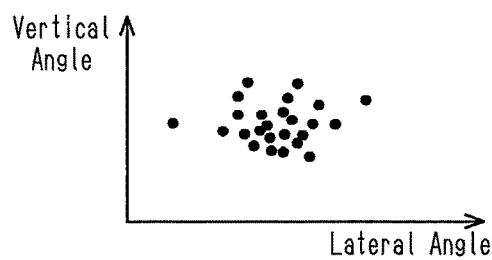
FIGS. 4A and 4B are diagrams illustrating an example of the distribution of sightlines of the driver according to the sightline estimation system illustrated in FIG. 1, where
Figure 4B:
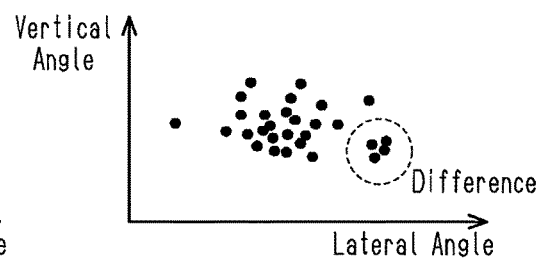

FIGS. 4A and 4B each illustrate a sightline distribution under the assumption that related information indicates traveling on a straight ordinary road. FIG. 4A illustrates an example of a sightline distribution included in sightline information held in the storage unit 40, while FIG. 4B illustrates an example of a sightline distribution held in the temporary holding unit 23. Assuming that the sightline distribution illustrated in FIG. 4A is a reference distribution, one or more sightlines not included in the sightline distribution in FIG. 4A but included in the sightline distribution in FIG. 4B are acquired as a newly added difference.

Figure 5A:
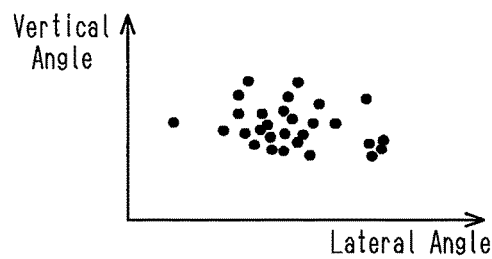
FIGS. 5A and 5B are diagrams illustrating another example of the distribution of sightlines of the driver according to the sightline estimation system illustrated in FIG. 1; where
Figure 5B:
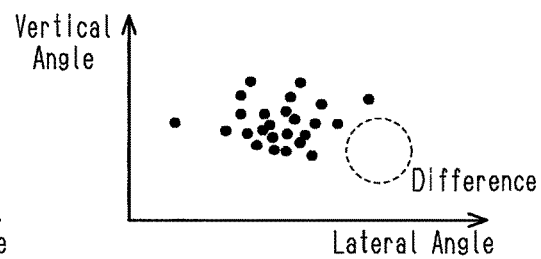

FIGS. 5A and 5B each illustrate a sightline distribution under the assumption that related information indicates a course change to a right lane of an ordinary road. FIG. 5A illustrates an example of a sightline distribution included in sightline information held in the storage unit 40, while FIG. 5B illustrates an example of a sightline distribution held in the temporary holding unit 23. Assuming that the sightline distribution illustrated in FIG. 5B is a reference distribution, one or more sightlines included in the sightline distribution in FIG. 5A but not included in the sightline distribution in FIG. 5B are acquired as a lacking difference.

The difference acquisition unit 310 includes the sightline information search unit 31 which searches for sightline information held in the storage unit 40, a comparison preparation unit 32 which prepares two sightline distributions to be compared, and a difference extraction unit 33 which extracts a difference between the two sightline distributions.

The sightline information search unit 31 sets the related information used as a search condition, searches for sightline information including the related information corresponding to the search condition from sightline information registered in the sightline information database 41, and acquires the search result of the sightline information. More specifically, the sightline information search unit 31 sets one or more pieces of information selected from vehicle information, environmental information, and location information as a search condition. For example, the sightline information search unit 31 sets a predetermined vehicle speed range corresponding to an ordinary road in case of search for sightline information corresponding to an ordinary road as a search condition, or sets a predetermined vehicle speed range corresponding to a highway when searching for sightline information corresponding to a highway as a search condition. In this manner, the sightline information search unit 31 can search sightline information indicating a vehicle speed close to a vehicle speed included in related information corresponding to a sightline distribution held in the temporary holding unit 23. Related information may also include location information. Thus, a search condition may include a condition of location within a predetermined positional range, that is, location within a range of a predetermined distance from a certain position. In this manner, the sightline information search unit 31 can search sightline information indicating a location close to a location included in related information corresponding to sightline distribution held in the temporary holding unit 23.

The comparison preparation unit 32 prepares for comparison between two sightline distributions. More specifically, the comparison preparation unit 32 acquires a sightline distribution of the driver from the temporary holding unit 23 and related information corresponding to the acquired sightline distribution. The comparison preparation unit 32 further sets the related information acquired from the temporary holding unit 23 as a search condition for the sightline information search unit 31 and acquires sightline information registered in the sightline information database 41. The comparison preparation unit 32 transmits, to the difference extraction unit 33, the sightline distribution of the driver acquired by the sightline acquisition unit 20, and the sightline distribution included in the sightline information held in the sightline information database 41.

The comparison preparation unit 32 starts preparation of a comparison between two sightline distributions at the time of acquisition of a difference. Examples of the time for acquiring the difference include: the point of time when the predetermined period for calculation by the period calculation unit 25 starts, the point of time when the predetermined period ends, and one or more points of time between the point of times when predetermined period starts and ends. When two sightline distributions are compared at a time close to the start of the predetermined period, a difference may be extracted in an early stage. In this case, however, the difference may be extracted with lower accuracy. When two sightline distributions are compared at a time close to the end of the predetermined period, the difference may be extracted with high accuracy. In this case, however, a delay may be produced in determination of the difference.

The difference extraction unit 33 sets a sightline distribution included in sightline information registered in the sightline information database 41 as a reference and sets an acquired sightline distribution of the driver held in the temporary holding unit 23 as a comparison subject to acquire a difference between the two sightline distributions. Then, the difference extraction unit 33 extracts a sightline that does not exist in the reference sightline distribution but exists in the comparison subject sightline distribution as a newly added difference or extracts a sightline that exists in the reference sightline distribution but does not exist in the comparison subject sightline distribution as a lacking difference.

The difference acquisition unit 310 therefore acquires the newly added difference or lacking difference as a difference between the reference sightline distribution and the comparison subject sightline distribution.

The sightline estimation unit 34 estimates a sightline of the driver in correspondence with the difference acquired by the difference acquisition unit 310. The sightline estimation unit 34 estimates that the sightline of the driver is within a range of the newly added difference based on the newly added difference acquired by the difference acquisition unit 310. Alternatively, the sightline estimation unit 34 estimates that the sightline of the driver is not within a range of the lacking difference based on the lacking difference acquired by the difference acquisition unit 310.

The sightline estimated from the difference will now described with reference to FIGS. 4A, 4B, 5A, and 5B.

FIG. 4A illustrates a reference sightline distribution held in the storage unit 40, while FIG. 4B illustrates a comparison subject sightline distribution acquired by the sightline acquisition unit 20. A newly added difference is acquired in a range surrounded by a dotted line illustrated in FIG. 4B from a comparison between the reference and the comparison subject. Based on the newly added difference, it is estimated that an object attracting attention from the driver exists in a direction corresponding to the newly added difference. Examples of an event which may be estimated based on these sightline distributions include the driver intending to enter the right lane.

FIG. 5A illustrates a reference sightline distribution held in the storage unit 40, while FIG. 5B illustrates a comparison subject sightline distribution acquired by the sightline acquisition unit 20. A lacking difference is acquired in a range surrounded by a dotted line illustrated in FIG. 5B from a comparison between the reference and the comparison subject. Based on the lacking difference, it is estimated that no sightline is present in a direction corresponding to the lacking difference. Under a normal condition, a sightline is present in the direction corresponding to the lacking difference. Examples of an event which may be estimated based on these sightline distributions include erroneous operation of the direction indicator by the driver or a situation in which the driver determined not to change lanes.

With reference to FIG. 6, a process for estimating the sightline of the driver performed by the sightline estimation system according to the present embodiment will now be described. According to the present embodiment, the process for estimating the sightline is performed in a predetermined cycle. The predetermined cycle is set to, for example, a cycle appropriate for drive assistance or a cycle appropriate for providing information.

When the process for estimating a sightline starts, the location information acquisition unit 22 of the processing unit 10 acquires location information configuring the related information (step S10). The vehicle information acquisition unit 211 of the processing unit 10 acquires vehicle information configuring related information (step S11). The period calculation unit 25 of the processing unit 10 calculates a predetermined period appropriate for acquiring a sightline distribution corresponding to the related information (step S12). The processing order of the processes from step S10 to step S12 is not limited to the order specified herein.

The processing unit 10 acquires sightlines of the driver during the predetermined period calculated by the period calculation unit 25 (step S13) and generates sightline information based on the acquired sightlines of the driver and the related information (step S14). In this manner, sightline information is generated which includes a visual distribution configured by a plurality of sightlines of the driver acquired within the predetermined period calculated by the period calculation unit 25.

The comparison preparation unit 32 of the processing unit 10 sets the vehicle information acquired in step S11 as a search condition. The sightline information search unit 31 searches sightline information corresponding to the search condition (step S15) to acquire sightline information corresponding to the search condition (step S16).

The difference extraction unit 33 of the processing unit 10 compares a reference sightline distribution with a comparison subject sightline distribution to extract a difference based on a comparison result (step S17) and determine whether or not there is a difference (step S18). When determining that there is no difference (NO in step S18) the processing unit 10 ends the process for estimating a sightline.

When determining that there is a difference (YES in step S18), the processing unit 10 estimates a characteristic sightline included in the sightlines of the driver based on the difference (step S19). More specifically, the processing unit 10 estimates a characteristic sightline based on an area of a newly added difference or an area of a lacking difference extracted by the difference extraction unit 33.

Thereafter, the processing unit 10 notifies the vehicle 1 of a newly added difference or a lacking difference via the on-board network or the like (step S20). When the newly added difference lies in a region corresponding to a door mirror of the vehicle 1 in the distribution, it is estimated that the driver is watching a rear vehicle for one reason or the other. In this case, information of the rear vehicle, such as difference in speed from the rear vehicle, is notified to the driver. When the distribution of the newly added difference is in a region outside the road in front of the vehicle, it is estimated that the driver is looking at a certain event near the road. In this case, information on the corresponding event is notified to the driver. When the distribution of the lacking difference is in a region corresponding to an assisting mirror of the vehicle 1, it is estimated that the driver has not looked and checked the mirror. In this case, the driver is notified to check the mirror. Accordingly, the characteristic of the estimated sightline can be utilised for driving assistance or other purposes.

As described above, the sightline estimation system according to the first embodiment has the following advantages.

(1) A comparison is made between two sightline distributions corresponding to identical or similar pieces of related information, that is, a sightline distribution of the driver included in sightline information held in the storage unit 40, and a sightline distribution of the driver detected by the sightline detection unit 11. In this case, discrepancy between the sightline distribution of the driver held in the storage unit 40 and the detected sightline distribution of the driver is easily extracted as a difference. This difference clarifies a newly added direction or a lacking direction in the sightline of the driver detected by the sightline detection unit 11 as a characteristic of a sightline of the driver using the sightline distribution of the driver held in the storage unit 40 as a reference. Thereafter, a sightline characteristic of the driver is estimated based on the difference to, for example, provide driving assistance for the driver or provide the driver with information on the event attracting the attention of the driver based on the estimated sightline characteristic.

Furthermore, a comparison is made between sightlines each including a change over time to acquire a difference between the sightline distribution of the storage unit 40 and the detected sightline distribution acquired during a predetermined period. The difference between the sightline distributions within the predetermined period allows the characteristic of sightlines to be obtained further suitably when changing lane or when driving in an area when a landmark can be seen.

Moreover, even when the accuracy of each acquired sightline is not high, the accuracy of the acquired difference is improved by the use of a sightline distribution configured by a collection of sightlines that averages the accuracy of the sightlines.

(2) Under the assumption that related information includes a vehicle speed, it is determined whether or not existing related information, which indicates a condition that a vehicle speed of the related information is within a predetermined speed range, corresponds to related information that is currently acquired. In this case, the characteristic of a sightline of the driver is determined by using existing sightline information including vehicle speed that is similar to the vehicle speed included in the related information currently acquired as a reference. Moreover, the difference between the vehicle speed included in the existing sightline information and the vehicle speed included in the related information currently acquired is minimised. This reduces the effect of the vehicle speed difference on the extraction accuracy of the difference between sightline distributions.

(3) Under the assumption that related information includes location information, it is also determined whether or not existing related information, which indicates a condition that a location included in the related information is within a predetermined distance range, corresponds to related information that is currently acquired. In this case, the characteristic of the sightline of the driver is determined by using existing sightline information including location information similar to the location information included in the related information currently acquired as a reference. Moreover, a difference between the location information included in the existing sightline information and the location information included in the related information currently acquired is minimised. This reduces the effect of the location information difference on the extraction accuracy of the difference between sightline distributions.

(4) Sightline information generated by the sightline information generation unit 24 is accumulated in the storage unit 40. The accumulation of the sightline information used for extraction of the difference between sightline distributions is expected to improve determination accuracy of the difference.

Second Embodiment

Figure 7:
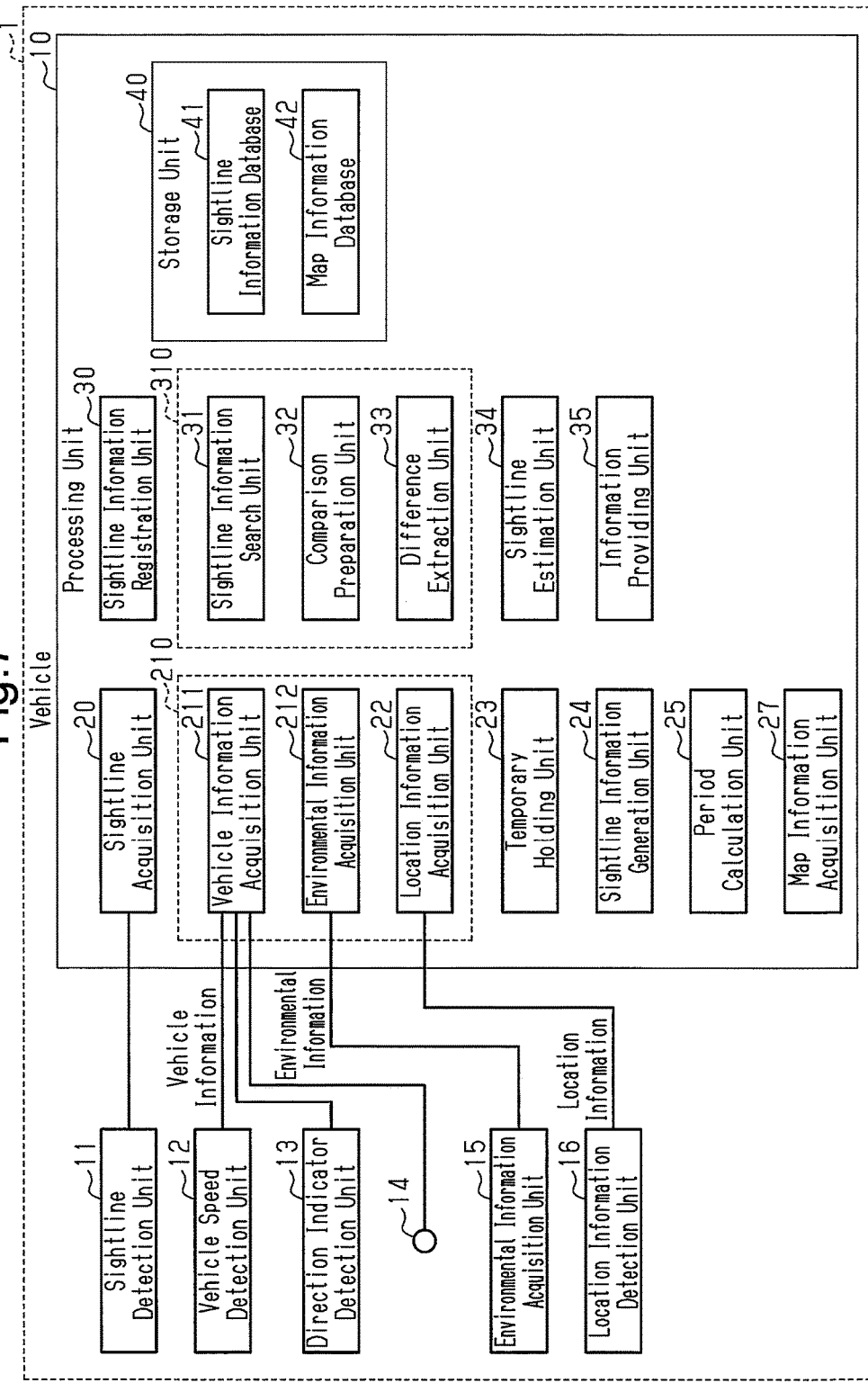
FIG. 7 is a schematic block diagram illustrating the configuration of a sightline estimation system in a second embodiment.

A sightline estimation system in a second embodiment will now be described with reference to FIGS. 7 through 1. The second embodiment differs from the first embodiment in that a map information database 42 included in the storage unit 40 is added. Same reference numerals are given to those components that are the same as the corresponding components of the first embodiment. Such components will not be described in detail. The description will center on parts differing from the first and second embodiments.

According to the second embodiment, the storage unit 40 further includes the map information database 42. The map information database 42 holds road information including road forms, regulation information, facility information of buildings, parks and the like, and other information in association with latitude/longitude information.

The processing unit 10 further includes a map information acquisition unit 27, which acquires designated latitude and longitude and map information around the designated coordinates, and an information providing unit 35, which provides the driver or the like with information including map information.

The map information acquisition unit 27 designates latitude and longitude based on location information included in related information to acquire map information indicating the designated latitude and longitude and surroundings of the designation and adds the acquired map information to related information. The related information to which the map information has been added by the map information acquisition unit 27 is added to sightline information generated by the sightline information generation unit 24. Accordingly, the sightline information including related information to which the map information has been added is registered to the sightline information database 41.

The sightline information search unit 31 may set an item included in the map information as a search condition. In addition, the sightline information search unit 31 may search sightline information which includes related information corresponding to a search condition from sightline information registered in the sightline information database 41 based on map information set as the search condition and acquire the searched sightline information. More specifically, the sightline information search unit 31 may set at least one piece of information included in vehicle information, traveling environmental information, location information, and map information included in related information as a search condition to search for sightline information registered in the sightline information database 41 based on the search condition.

The information providing unit 35 identifies a position on a map corresponding to an area of a newly added difference estimated by the sightline estimation unit 34, acquires information registered for the identified position, and provides the acquired information to the driver or the like in the form of an image, a voice or the like.

Figure 8A:
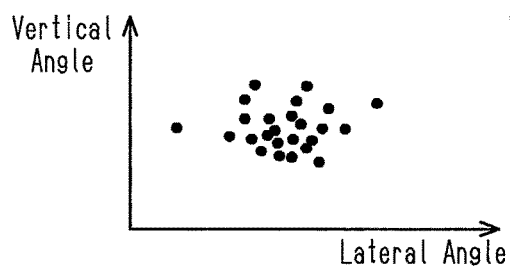
FIGS. 8A and 8B are diagrams illustrating an example of the distribution of sightlines of the driver according to the sightline estimation system illustrated in FIG. 7, where
Figure 8B:
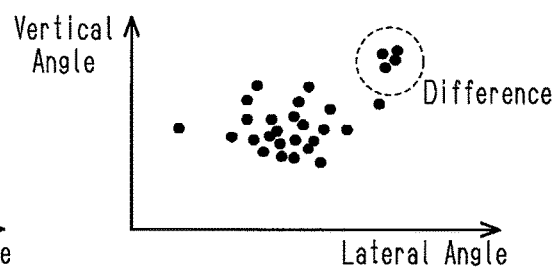

For example, it is assumed herein that a newly added difference between a reference sightline distribution (FIG. 8A) held in the storage unit 40 and a comparison subject sightline distribution (FIG. 8B) acquired by the sightline acquisition unit 20 in the area surrounded by a dotted line in FIG. 8B.

Figure 9:
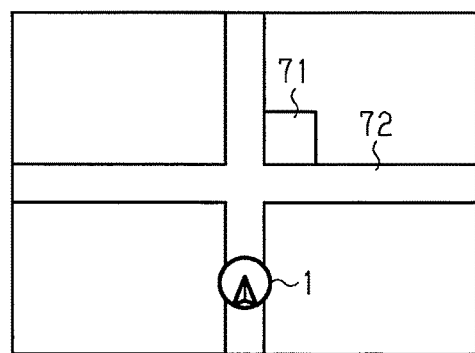
FIG. 9 is a view illustrating an example of map information acquired by the sightline estimation system illustrated in FIG. 7.
Figure 10:
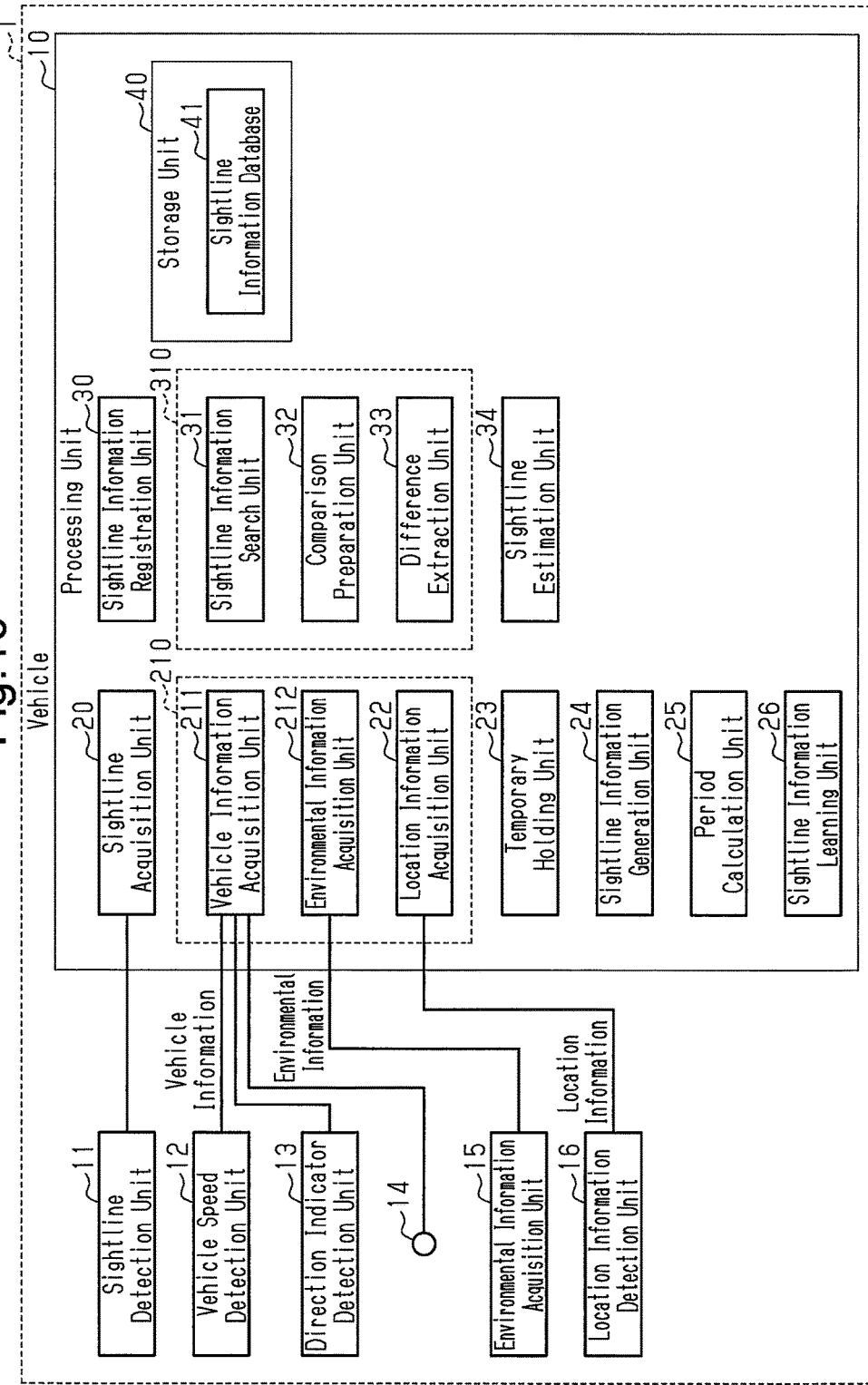
FIG. 10 is a block diagram illustrating a schematic configuration of a sightline estimation system embodied in a third embodiment.

It is therefore estimated that the sightline of the driver is directed to a location corresponding to the area of the newly added difference. Accordingly, as illustrated in FIG. 9, the information providing unit 35 searches through the map information database 42 to acquire map information indicating the position corresponding to the area of the newly added difference. Thereafter, the information providing unit 35 provides, to the driver, information related to a building 71 or another road 72 where the sightline or the driver is directed toward according to the estimation. Accordingly, the estimated sightline can be used to provide the driver with information of the traveling environment or information of something interesting to the driver.

When a lacking difference is acquired, the information providing unit 35 acquires information related to the position corresponding to the area of the lacking difference from the map information and provides the acquired information to the driver or the like in the form of an image or voice when the acquired information is useful. For example, the information providing unit 33 provides, to the driver, information related to a building that the driver is searching for or information related to a street or the like that the driver did not notice according to the estimation. Accordingly, the estimated sightline can be used for notifications in driving assistance or the like.

As described above, following advantages are obtained by the sightline estimation system according to the present embodiment in addition to advantages (1) to (4) described in the first embodiment.

(5) Related information includes information related to a traveling environment acquired from the map information as well as the location information. This increases the accuracy of the corresponding relationship between the information held in the storage unit 40 and the acquired related information. Accordingly, the appropriateness of the sightline characteristic acquired from the difference between sightline distributions is further increased.

(6) An event in a direction of a sightline is estimated when there is a discrepancy from the reference sightline based on map information. This allows information corresponding to the estimated event to be provided.

Third Embodiment

A sightline estimation system in a third embodiment will now be described with reference to FIGS. 10 to 13. The third embodiment different from the first embodiment in that the processing unit 10 further includes a sightline information learning unit 26. Same reference numerals are given to those components that are the same as the corresponding components of the first embodiment. Such components will not be described in detail. The description will center on parts differing from the first and second embodiments.

In the third embodiment, the processing unit 10 further includes a sightline information learning unit 26 which learns sightline information.

The sightline information learning unit 26 learns sightline information based on the occurrence frequency of sightlines to learn a sightline distribution of the driver included in sightline information of identical or similar related information. The sightline information learning unit 26 further registers a learning result to the sightline information database 41. Generalization of sightline information is expected to increase by repetitive learning the sightline information. Accordingly, reference sightline information becomes more appropriate for a reference used for extraction of a difference between sightline distributions. Moreover, the sightline information learning unit 26 is configured to determine necessity of learning, and an appropriate type of learning in accordance with an instruction from the processing unit 10 performing various processes, or an instruction from the outside.

Types of learning performed by the sightline information learning unit 26 are roughly divided into two types. The first type is learning performed for a combination of sightline information held in the temporary holding unit 23 and sightline information held in the storage unit 40. The second type is learning further performed for sightline information held in the storage unit 40. For example, in the first type of learning, new contents of sightline information are reflected in the existing sightline information. In the second type of learning, existing sightline information is organised, or sightline information corresponding to new related information is learned.

Processing procedures of the first type of learning will now be described with reference to FIGS. 11 and 12.

Figure 11:
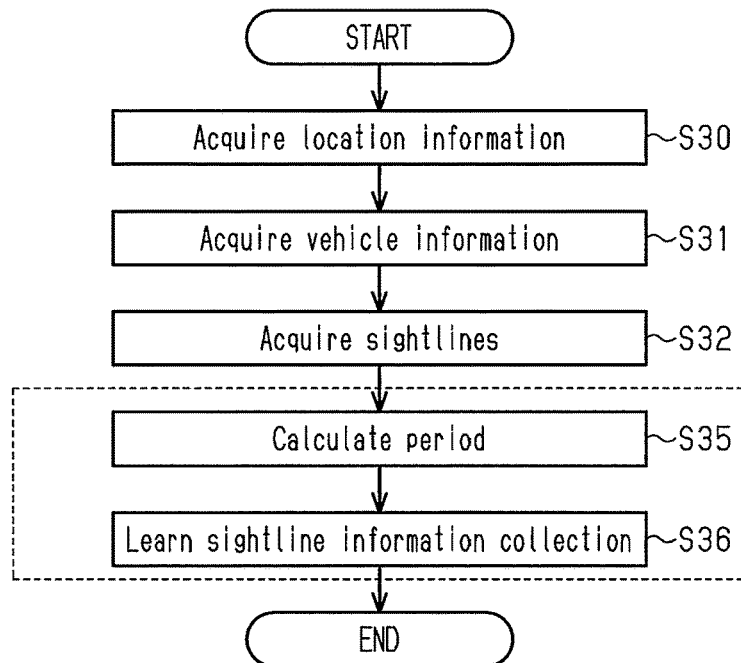
FIG. 11 is a flowchart illustrating procedures performed by the sightline estimation system illustrated in FIG. 10 to register sightline information while learning the sightline information.

As illustrated in FIG. 11, when the process for registering sightline information starts, the location information acquisition unit 22 of the processing unit 10 acquires location information (step S30). The vehicle information acquisition unit 211 acquires vehicle information (S31). The sightline acquisition unit 20 acquires a sightline of the driver (step S32). The period calculation unit 25 of the processing unit 10 further calculates a predetermined period based on related information corresponding to the location information and the vehicle information acquired in steps S30 and S31 (step S35). In this manner, the sightline information generation unit 24 generates sightline information, which includes sightlines of the driver acquired within the predetermined period, and the related information in association with each other. Thereafter, the sightline information learning unit 26 of the processing unit 10 learns sightline information (step S36).

Figure 12:
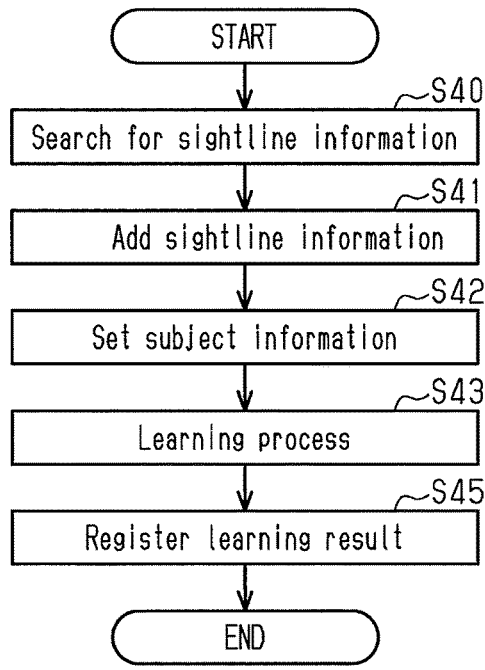
FIG. 12 is a flowchart illustrating procedures of a process performed by the sightline estimation system illustrated in FIG. 10 to learn sightline information.

As illustrated in FIG. 12, when starting to learn the sightline information in step S36, the processing unit 10 sets the vehicle information acquired in step S31 as a search condition of the sightline information search unit 31. The processing unit 10 searches sightline information based on the set vehicle information and acquires sightline information as a search result (step S40). The sightline information learning unit 26 of the processing unit 10 adds sightline information generated by the sightline information generation unit 24 to sightline information acquired from the storage unit 40 as the search result (step S41) and sets the sightline information acquired from the storage unit 40 and the sightline information generated by the sightline information generation unit 24 as learning subject information (step S42). Thereafter, the sightline information learning unit 26 of the processing unit 10 learns sightlines of the driver included in the sightline information selected as the learning subject (step S43). The learning is performed based on the occurrence frequency of sightlines included in a sightline distribution, for example. When the learned sightline information is acquired, the sightline information learning unit 26 registers the acquired sightline information to the sightline information database 41 together with the related information (step S45). The learning of sightline information performed by the first type of learning method is completed in this manner.

Processing procedures of the second type of learning method, that is, re-learning will now be described with reference to FIG. 13.

Figure 13:
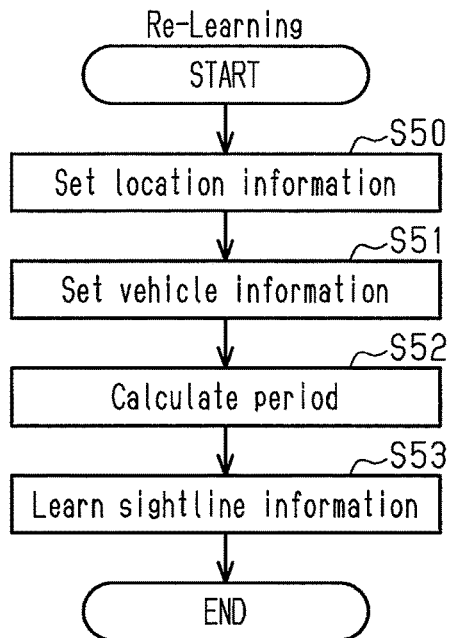
FIG. 13 is a flowchart illustrating procedures of a process performed by the sightline estimation system illustrated in FIG. 10 to re-learn sightline information.

As illustrated in FIG. 13, when re-learning starts, the processing unit 10 selects related information as a subject for re-learning. More specifically, the processing unit 10 selects location information (step S50) and vehicle information (step S51). In addition, the period calculation unit 25 of the processing unit 10 calculates a period based on related information corresponding to the vehicle information selected in step S51 (step S52). Thereafter, the processing unit 10 learns sightline information (step S53).

Part of FIG. 12 is hereinafter referred. When starting the learning of the sightline information in step S53, the related information selected in step S51 is set as a search condition of the sightline information search unit 31 to search for sightline information based on the selected related information. Accordingly, sightline information is acquired as a search result (step S40). Subsequently, the processing unit 10 sets the sightline information acquired from the storage unit 40 as learning subject information (step S42). Thereafter, the sightline information learning unit 26 of the processing unit 10 learns sightlines of the driver included in the sightline information selected as the learning subject (step S43). When the learned sightline information is acquired, the acquired sightline information is registered to the sightline information database 41 together with the related information (step S45). The re-learning of sightline information performed by the second type of learning method is completed in this manner.

As described above, the sightline estimation system according to the present embodiment has the advantages described below in addition to advantages (1) to (4) described in the first embodiment.

(7) According to the second type of learning, learning is performed for sightline distributions of the driver which are each included in sightline information held in the storage unit 40 and associated with particular related information. In this case, a highly accurate difference is acquired by the comparison between the related information learned in this manner and acquired sightline information.

(8) According to the first type of learning, learning is performed based on sightlines of the driver associated with newly acquired related information and existing sightlines of the driver held in the storage unit 40. The learning of sightlines of the driver including newly acquired sightlines is expected to produce a learning result appropriate for a new situation.

(9) Learning is performed under the condition indicating the frequency of the direction of each sightline. In this case, importance of the direction of each sightline is determined in accordance with the frequency of the corresponding direction. Accordingly, applicability of a learning result of a reference sightline distribution increases.

OTHER EMBODIMENTS

Each of the above embodiments may be modified as described below.

Combination of Embodiments

Two or more of the first through third embodiments may be combined. More specifically, a combination of the first embodiment and the second or third embodiment, a combination of the second embodiment and the third embodiment, or a combination of the first through third embodiments may be provided.

Learning

In the third embodiment, a sightline distribution of the driver is learned. In this case, a sightline distribution may be learned for each driver. When sightlines are learned for each driver, a difference between sightline distributions is extracted based on sightline information more appropriate for each driver as a reference. Accordingly, difference extraction accuracy is improved.

In the third embodiment, sightline information is learned including identical or similar related information. However, when a state inappropriate for a subject of learning is contained in related information included in sightline information, the sightline information including the state inappropriate for a subject of learning may be excluded from the subject of learning. For example, when related information includes information indicating an operation input to an air conditioner or audio equipment, for example, sightline information corresponding to these situations is likely to include noise and therefore may be excluded from a subject of learning. In this manner, reference sightline information including less noise is learned.

In the third embodiment, the sightline information learning unit 26 learns sightline distributions of the driver included in piece of sightline information corresponding to identical or similar related information based on frequencies of sightlines to learn reference sightline information. However, any learning method may be employed as long as appropriate reference sightline distributions can be generated. Moreover, such a learning method may be employed which automatically searches for a characteristic point (parameter) from application parameters set beforehand based on a large number of collected pieces of sightline information to use and learn the searched characteristic point as related information, for example. The related information employed in this manner may be set as a search condition.

When such learning is performed for each driver, the related information can be classified into groups each matched with a driving behavior of the corresponding driver.

In the third embodiment, currently acquired sightline information and held existing sightline information are both learned. However, only sightlines of the driver induced in currently acquired sightline information may be learned and registered.

Figure 15:
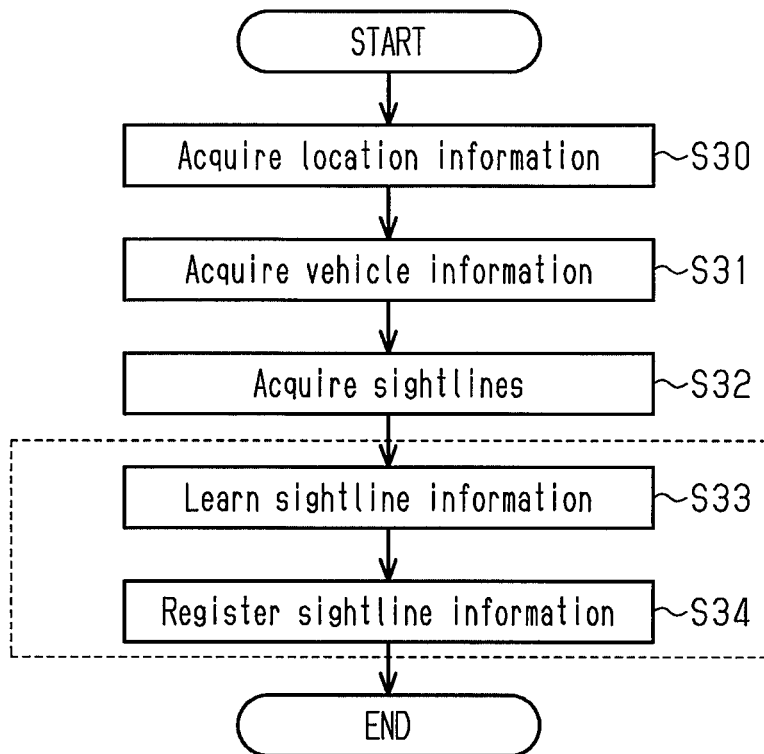
FIG. 15 is a flowchart illustrating procedures performed by a sightline estimation system embodied in a further embodiment to register a detected sightline of the driver while learning the sightline.

More specifically, as illustrated in FIG. 15, the location information acquisition unit 22 of the processing unit 10 acquires location information (step S30). The vehicle information acquisition unit 211 acquires vehicle information (step S31). The sightline acquisition unit 20 acquires a sightline of the driver (step S32). The processing unit 10 learns a sightline distribution of the driver based on a frequency of each sightline in the sightline distribution to learn sightline information corresponding to identical or similar vehicle information and including sightlines of the driver acquired in a predetermined period (step S33). Thereafter, the sightline information serving as a learning result including vehicle information may be registered to the sightline information database 41 (step S34). When sightline information, is registered in this manner, sightlines of the driver to be registered are sightlines that have been learned at the time of registration. Accordingly, efficiency of a later learning process increases.

Registration and Search of Sightline Information

In each embodiment, sightline information is registered to the sightline information database 41 beforehand. However, sightline information may be accumulated in the sightline information database 41 through registration or learning of the sightline information during traveling of the vehicle 1.

In each embodiment, the sightline information registration, unit 30 registers sightline information generated by the sightline information generation unit 24, and related information configuring the sightline information in such a manner as to register the sightline information and the related information in the sightline information database 41 in association with each other. However, the sightline information registration unit 30 may register one sightline of the driver acquired by the sightline acquisition unit 20 and related information acquired by the related information acquisition unit 210 in such a manner as to register the one sightline and the related information to the sightline information database 41 in association with each other. In this case, the sightline of the driver and the related information registered in this manner may be sorted, analysed, and learned by a machine later, for example, to generate sightline information for each piece of related information.

In each embodiment, the sightline information database 41 is a database in which sightline information is registered. However, a detected sightline of the driver and related information acquired at the time of detection of the corresponding sightline may be registered to the sightline information database 41 in association with each other every time a sightline of the driver is detected. In this case, time-series data containing sightlines of the driver is acquired through registration.

Figure 14:
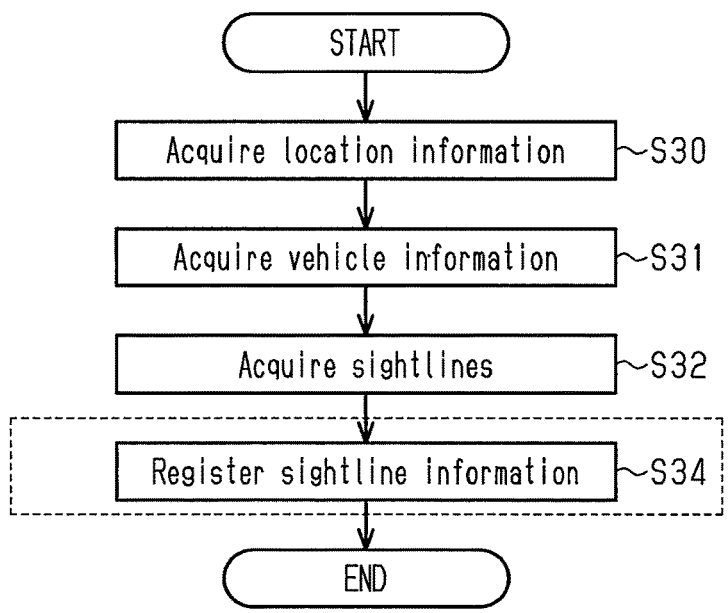
FIG. 14 is a flowchart illustrating procedures performed by a sightline estimation system embodied in another embodiment to register a detected sightline of the driver without change.

More specifically, as illustrated in FIG. 14, the location information acquisition unit 22 of the processing unit 10 acquires location information (step S30). The vehicle information acquisition unit 211 acquires vehicle information (step S31). The sightline acquisition unit 28 acquires a sightline of the driver (step S32). Thereafter, information which associates the acquired sightline of the driver with the vehicle information is registered to the sightline information database 41 (step S34). In this case, a process such as learning may be performed later for a sightline registered whenever detection is performed.

More specifically, the sightline information search unit 31 may search a sightline of the driver corresponding to a search condition from the sightline information database 41. In this case, a sightline distribution corresponding to related information may be produced later based on sightlines of the driver even stored simply in time series.

In the embodiments, information is registered to the sightline information database 41 associating a sightline of the driver detected by the sightline detection unit 11 with related information acquired at the time of detection of the sightline of the driver and related to traveling of the vehicle 1 driven by the driver. However, a sightline of a driver detected by a different vehicle and related information may be registered to the sightline information database 41 in association with each other. More specifically, information may be registered in the sightline information database 41 associating a sightline of a driver detected by a sightline detection unit of a different vehicle with related information acquired at the time of detection of the sightline of the driver and related to traveling of one different vehicle driven by the driver in association with each other.

Sightlines of drivers detected by different vehicles and related information may be registered to one sightline information database.

In addition, a sightline information database may be provided at a central facility, for example, to collect sightlines of drivers and related information from a large number of vehicles.

In each embodiment, the period calculation unit 25 sets a period ranging from 5 seconds to 10 seconds for an ordinary road, a period ranging from 10 seconds to 20 seconds for a highway, a period from when a right or left turn signal of the direction indicator starts to when it ends, and a period from several seconds before starting a right or left turn signal of the direction indicator to several seconds after it ends when changing lanes. However, other appropriate periods may be set as long as sightline information appropriate for comparison can be acquired. Each period may be longer or shorter than the periods described herein by way of example.

In each embodiment, related information includes a parameter of a vehicle speed for classification into an ordinary road and a highway, and parameters of a vehicle speed and an action of the direction indicator for classification into a rightward turn, a leftward turn, a course change to a right lane, and a course change to a left lane. However, related information may include a steering angle, other vehicle situations, traveling environments, location information and the like for classification into an ordinary road, a highway, a leftward or rightward turn, and a course change. In addition, related information may further include information indicating operation of wipers, lighting of lights, operation of an air conditioner, operation of audio equipment, and others as vehicle information.

In each embodiment, related information may include speed. However, speed may be excluded from related information as long as appropriate sightline information can be selected under required conditions. For example, related information may include only location information and a traveling direction.

Sightline Information

In each embodiment, sightline information includes related information, and a plurality of sightlines of the driver corresponding to the related information, namely, the sightline distribution, however, sightline information is not required to include related information as long as sightline information is associated with related information.

In each embodiment, the period calculation unit 25 calculates a predetermined period for detecting sightline information. However, a sightline distribution acquired within a predetermined period may be sightline distribution acquired within a traveling time of the vehicle 1 for a predetermined distance as long as an appropriate sightline distribution can be acquired as sightline information under a situation indicated by related information. In this case, appropriate sightline information associated with related information can be acquired even based on a traveling distance.

Sightline Distribution

In each embodiment, each of a plurality of sightlines of the driver is plotted based on a lateral direction angle and a vertical direction angle in the front direction of the vehicle 1. However, each sightline may be represented by a combination of units other than a combination of vertical direction angle and the lateral direction angle as long as a difference between two sightlines can be acquired by a comparison between the two sightlines.

Figure 16:
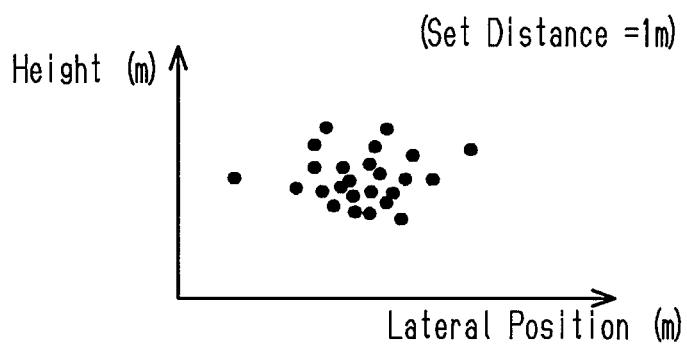
FIG. 16 is a view illustrating an example of a distribution of sightlines presented in an X-Y plane according to a sightline estimation system embodied in a still further embodiment.

For example, as illustrated in FIG. 16, each sightline of the driver may be represented by a vertical direction height and a lateral direction position in a reference plane defined at a setting distance (e.g., set distance of 1 m) determined beforehand from the eyes of the driver.

Communication Protocol

In each embodiment, the communication protocol to be used is a CAN protocol. However, the communication protocol may be a protocol other than a CAN protocol, such as Ethernet (registered trademark) and FlexRay (registered trademark), as long as a message counter is used for securing reliability of a communication message.

The invention claimed is:

1. A sightline estimation system that estimates a sightline characteristic of a driver of a vehicle, the system comprising:
   a sightline detection unit configured to detect a sightline of the driver with respect to a traveling direction of the vehicle;
   a related information acquisition unit configured to acquire related information that is information related to traveling of the vehicle;
   a holding unit that holds sightline information that associates a sightline of the driver detected by the sightline detection unit with the related information acquired at the time of detection of the sightline of the driver; and
   a difference extraction unit configured to perform a selection process that selects, from the related information held in the holding unit, the related information corresponding to the related information acquired at the time of current detection of the sightline of the driver and further configured to extract a difference between a distribution of sightlines of the driver acquired from the sightline information associated with the selected related information and a distribution of the sightlines acquired within a predetermined period including the current detection of the sightline; and
   a sightline estimation unit configured to estimate a sightline characteristic based on the difference extracted by the difference extraction unit, the sightline characteristic being a sightline of the driver contained in the distribution of sightlines of the driver acquired from the sightline information associated with the selected related information, but not contained in the distribution of the sightlines acquired within the predetermined period including the current detection of the sightline, or a sightline not contained in the distribution of sightlines of the driver acquired from the sightline information associated with the selected related information, but contained in the distribution of the sightlines acquired within the predetermined period including the current detection of the sightline.

2. The sightline estimation system according to claim 1, wherein
   the related information includes a vehicle speed, and
   the selection process is performed under a condition that the vehicle speed is within a predetermined speed range.

3. The sightline estimation system according to claim 1, further comprising a location information acquisition unit configured to acquire location information indicating position of the vehicle, wherein
   the related information includes the location information, and the selection process is performed under a condition that the position included in the location information is within a predetermined distance range.

4. The sightline estimation system according to claim 3, wherein
   the holding unit further holds map information,
   the map information includes information related to a traveling environment corresponding to a position identified based on the location information, and the related information includes the information related to the traveling environment.

5. The sightline estimation system according to claim 4, further comprising a processing unit configured to estimate an event located at a position corresponding to an area including the difference based on the map information.

6. The sightline estimation system according to claim 1, further comprising an information registration unit configured to additionally register the sightline information to the holding unit.

7. The sightline estimation system according to claim 1, further comprising a sightline information learning unit configured to acquire one or more pieces of the sightline information associated with particular at least one piece of the related information from one or more pieces of the sightline information held in the holding unit, learn a distribution of sightlines included in the acquired one or pieces of the sightline information, and hold a result of the learning in the holding unit in association with the particular related information.

8. The sightline estimation system according to claim 7, wherein the sightline information learning unit is configured to set the related information acquired by the related information acquisition unit as the particular related information and learn the distribution of the sightlines based on the sightlines included in the acquired sightline information and the sightline of the driver detected through a current detection performed by the sightline detection unit.

9. The sightline estimation system according to claim 7, wherein the sightline information learning unit is configured to perform the learning based on a frequency in which the sightline is directed in each direction.

10. A method for estimating a sightline characteristic of a driver of a vehicle, the method comprising:
    detecting a sightline of the driver with respect to a traveling direction of the vehicle;
    acquiring related information related to traveling of the vehicle;
    holding sightline information that associates a detected sightline of the driver with the related information acquired at the time of detection of the sightline of the driver;
    performing a selection process that selects, from the held related information, the related information corresponding to the related information acquired at the time of current detection of the sightline of the driver;
    extracting a difference between a distribution of sightlines of the driver acquired from the sightline information associated with the selected related information and a distribution of the sightlines acquired within a predetermined period including the current detection of the sightline; and
    estimating a sightline characteristic of the driver based on the extracted difference, the sightline characteristic being a sightline of the driver contained in the distribution of sightlines of the driver acquired from the sightline information associated with the selected related information, but not contained in the distribution of the sightlines acquired within the predetermined period including the current detection of the sightline, or a sightline not contained in the distribution of sightlines of the driver acquired from the sightline information associated with the selected related information, but contained in the distribution of the sightlines acquired within the predetermined period including the current detection of the sightline.

11. A sightline estimation system that estimates a sightline characteristic of a driver of a vehicle, the system comprising a circuitry, wherein the circuitry is configured to:
    detect a sightline of the driver with respect to a traveling direction of the vehicle;
    acquire related information related to traveling of the vehicle;
    hold sightline information that associates a detected sightline of the driver with the related information acquired at the time of detection of the sightline of the driver;
    perform a selection process that selects, from the held related information, the related information corresponding to the related information acquired at the time of current detection of the sightline of the driver;
    extract a difference between a distribution of sightlines of the driver acquired from the sightline information associated with the selected related information and a distribution of the sightlines acquired within a predetermined period including the current detection of the sightline; and
    estimate a sightline characteristic of the driver based on the extracted difference, the sightline characteristic being a sightline of the driver contained in the distribution of sightlines of the driver acquired from the sightline information associated with the selected related information, but not contained in the distribution of the sightlines acquired within the predetermined period including the current detection of the sightline, or a sightline not contained in the distribution of sightlines of the driver acquired from the sightline information associated with the selected related information, but contained in the distribution of the sightlines acquired within the predetermined period including the current detection of the sightline.

* * * * *

UNITED STATES PATENT AND TRADEMARK OFFICE
CERTIFICATE OF CORRECTION

| | |
|---|---|
| PATENT NO. | : 10,351,144 B2 |
| APPLICATION NO. | : 15/831901 |
| DATED | : July 16, 2019 |
| INVENTOR(S) | : Sayaka Yoshizu |

Page 1 of 1

It is certified that error appears in the above-identified patent and that said Letters Patent is hereby corrected as shown below:

In the Specification

In Column 2, Line 16, after "selects", insert --,--.

In Column 2, Line 19, delete "in" and insert --is-- therefor.

In Column 2, Line 58, delete "wild" and insert --with-- therefor.

In Column 4, Line 44, delete "defects" and insert --detects-- therefor.

In Column 11, Line 45, after "include", delete ":".

In Column 15, Line 56, after "sightline", delete "or" and insert --of-- therefor.

In Column 19, Line 46, after "registration", delete ",".

In Column 20, Line 8, delete "28" and insert --20-- therefor.

In Column 20, Line 34, delete "one" and insert --the-- therefor.

In Column 21, Line 11, delete "distribution, however" and insert --distribution. However-- therefor.

Signed and Sealed this
Third Day of September, 2019

Andrei Iancu
*Director of the United States Patent and Trademark Office*